US 8,544,021 B2

(12) United States Patent
Jones

(10) Patent No.: US 8,544,021 B2
(45) Date of Patent: Sep. 24, 2013

(54) EXECUTION CONTEXT ISOLATION IN A DRIVER EXECUTION ENVIRONMENT (DXE) WITH MARSHALING ARGUMENTS TO A COMMON LOCATION IN RESPONSE TO AN LPC

(75) Inventor: Stephen E. Jones, Bellevue, WA (US)

(73) Assignee: Kinglite Holdings Inc., Singapore (SG)

( * ) Notice: Subject to any disclaimer, the term of this patent is extended or adjusted under 35 U.S.C. 154(b) by 838 days.

(21) Appl. No.: 12/631,961

(22) Filed: Dec. 7, 2009

(65) Prior Publication Data

US 2010/0319001 A1 Dec. 16, 2010

Related U.S. Application Data

(60) Provisional application No. 61/268,562, filed on Jun. 13, 2009.

(51) Int. Cl.
*G06F 9/46* (2006.01)
*G06F 9/455* (2006.01)
*G06F 15/177* (2006.01)
*G06F 1/26* (2006.01)

(52) U.S. Cl.
USPC ........... 718/108; 718/102; 718/1; 713/1; 713/2; 726/34

(58) Field of Classification Search
None
See application file for complete search history.

(56) References Cited

U.S. PATENT DOCUMENTS

| 6,751,737 | B1 * | 6/2004 | Russell et al. ................. 726/34 |
| 7,003,759 | B2 | 2/2006 | Jameson |
| 7,392,527 | B2 * | 6/2008 | Callender ..................... 719/327 |
| 8,176,488 | B1 * | 5/2012 | Dobrovolskiy et al. .......... 718/1 |
| 2006/0069534 | A1 | 3/2006 | Kinney |
| 2008/0005615 | A1 | 1/2008 | Brenden et al. |
| 2008/0163209 | A1 | 7/2008 | Rozas |
| 2009/0293065 | A1 | 11/2009 | Kinney |
| 2010/0319000 | A1 | 12/2010 | Jones |

OTHER PUBLICATIONS

Local Procedure Call, en.wikipedia.org/wiki/Local_Procedure_Call, printed Nov. 6, 2009, 2 pages.
LPC Communication, www.zezula.net/en/prog/lpc.html, printed Nov. 6, 2009, 5 pages.
U.S. Appl. No. 12/610,224, Non-Final Office Action mailed Aug. 2, 2012 (20 pgs.).

* cited by examiner

*Primary Examiner* — Meng An
*Assistant Examiner* — Bing Zhao
(74) *Attorney, Agent, or Firm* — Lowe Hauptman & Ham, LLP

(57) ABSTRACT

Methods, systems, apparatuses and program products for providing for communications within a computing environment that provides for execution isolation, especially a DXE (Driver Execution Environment) phase of a PC (personal computer) startup process. Provision is made for blocking of server threads awaiting service requests and blocking client thread awaiting server responses, together with marshalling formal parameter descriptions and service request/response arguments across disparate execution contexts that disallow simple data redirection between them.

17 Claims, 5 Drawing Sheets

| | |
|---|---|
| SEC 202 | Security<br>Pre-verifier |
| PEI 204 | Pre-EFI initialization<br>Includes CPU clock mode, chipset, board initialization, RAM hardware level configuration. |
| DXE 206 | Driver Execution Environment<br>Includes EFI Driver Dispatcher, intrinsic services, Device, Bus and Service DXE Drivers |
| BDS 208 | Boot Device Selection<br>Includes Boot Manager, GRUB |
| TSL 210 | Transient System Load<br>Includes loading and initializing O/S |
| RT 212 | Run Time<br>Includes final O/S environment and O/S based applications programs |
| AL 214 | After Life<br>Includes support for shutdown or hibernate procedures |

FIG.2

EXECUTION CONTEXT ISOLATION IN A DRIVER EXECUTION ENVIRONMENT (DXE) WITH MARSHALING ARGUMENTS TO A COMMON LOCATION IN RESPONSE TO AN LPC

RELATED APPLICATIONS

This application claims priority to U.S. Provisional application for a patent No. 61/268,562 entitled INNOVATIONS IN SECURECORE TIANO 2.0 filed Jun. 13, 2009 inventor Stephen E. Jones and which is incorporated in its entirety by this reference.

FIELD OF THE INVENTION

The present invention generally relates to personal computers and devices sharing similar architectures and, more particularly relates to a system and corresponding method for communications within an environment that provides for execution isolation, especially a DXE (Driver Execution Environment) phase of a PC (personal computer) startup process. Similar processes within comparable computing apparatuses or within a single computer operational session or context also fall within the general scope of the invention.

BACKGROUND OF THE INVENTION

Modernly, the use of PCs (personal computers), including so-called laptop and notebook computers, is increasingly common and the computers themselves are ever more powerful and complex. A persistent problem is the unduly long elapsed time between the moment of power-on and the time when the PC has become ready for user stimulus and/or to initiate useful work.

Intel® Corporation first defined EFI (Extensible Firmware Interface) as the programming interface exposed by firmware to O/S (operating system); former comparable firmwares were not sufficiently portable nor scalable to Intel's CPU (Central Processor Unit) IA64 architecture. A first implementation of the EFI interface became known as Tiano, which Intel® Corporation offered under license via a web site. The UEFI Forum (Unified EFI Forum), a trade group, secured architectural control over EFI (and derivatives thereof) under a new name—UEFI, with a right to support and extend. The UEFI Forum documents and specifies the UEFI interface.

The PIWG (Platform Initialization Working Group) of the UEFI Forum provides a common internal framework for Silicon and platform drivers, so that a common understanding of the roles and methods used by Silicon and platform drivers is developed by implementers of UEFI firmware stacks together with the providers of the Silicon and platform drivers.

The UEFI and related standards provide richness, but fail to sufficiently address significant specific areas of concern including:

Quality of board bring-up user experience
Quality of BIOS customization experience
Duration of system bootloading and platform initialization time
Level of reliability
Level of compatibility with Intel's Foundation Core (also known as Foundation for short and a part of Tiano)
Scope for platform innovation by BIOS (basic input-output system) vendors and partners and customers thereof.

These attributes are described in the current version of SCT (SecureCore Tiano™) System Overview published by Phoenix® Technologies Ltd. Adequately addressing all of these areas of concern requires innovation above and beyond what is described in UEFI and PIWG standards. However, innovation needs to be at least backwards compatible with those same standards so as not to lose benefits of compliance therewith.

The EFI/UEFI environments provide for DXE (Driver Execution Environment) firmware running in a limited execution environment with a fixed control policy. A sole means of communication between drivers is the so-called Protocol, a means for drivers to publish pointers to internal routines and data so that other drivers may call and exploit them. Drivers, also known as device drivers are well-known in the computing arts. Although running in protected mode, with 32-bit or 64-bit addressability, the DXE environment implements drivers as connected islands of functional capabilities.

This environment relies on dependency expressions of protocols exposed by DXE drivers, and upon a schedule of DXE drivers to be loaded in a desirable order. Once loaded, DXE drivers are run once, publishing protocols as necessary, so that they might be called again only when their services are requested through published protocols. Limited services are provided by the Foundation for a DXE Driver to gain control on a timer tick, as well as being notified when an O/S loads or has finished loading. Functionality is thereby limited, perhaps unduly limited in view of the specific areas of concern previously mentioned. UEFI lacks a structural framework for execution that is sufficiently flexibly adaptable to problems presented in practical embodiments.

However, UEFI Specification(s) offer considerable richness by making it possible to combine drivers together into stacks in many different ways to form new compound capabilities. In this way UEFI compliant products may contemplate taking on a large problem space for the future.

While UEFI's protocols are well-defined, the execution vehicles providing support for drivers that implement these protocols in the native EFI environment is relatively primitive. There exists a need to provide a more feature-rich extension of the Foundation that provides for various needs. Described elsewhere is support for more modern programming paradigms. The present invention addresses, inter alia, the need for support for inter-communication between disparate execution contexts, including execution contexts that provide for the multiple processor modes found in modern CPUs (Central Processor Units). Early CPUs, such as conventional eight-bit microprocessors may have provided for only one or two modes (for example, user mode and supervisor or interrupts-disabled mode). Modernly many modes are exploited. Processor state may be reflected in programmed features such as processor contexts and process contexts as well as execution contexts. These may include, for example but not limited to, real, protected and paging memory accessing, direct, pass-through and virtualized I-O (input-output operations), System management modes (for example providing common memory addressing directed by NorthBridge chips across VMs (virtual machines)), STMs (system management interrupt transfer monitors), multiple CPU core operation including changes in the number of active cores, cache operational modes, clock speeds and so on.

A significant advantage of embodiments of the invention over previously developed solutions is that it becomes possible to use secure communications between contexts that provide for multiple processor, memory and other instruction-controlling modes, especially but not limited to hardware modes within and around any and all DXE phases of computer loading and initialization.

SUMMARY OF THE INVENTION

The present invention provides a method for operating a computer and also an apparatus that embodies the method. In addition program products and other means for exploiting the invention are presented.

According to an aspect of the present invention an embodiment of the invention may provide a method for, in a first execution context associating parameters and arguments of a called service request with storage and copying them into a Kernel supervised common area; within Kernel switching execution contexts to that of a server program needed to provide for the service request; marshalling a further copy of the parameters and arguments into a space in the execution context of the server program and conforming to its parameter specification.

According to a further aspect of the present invention an embodiment of the invention may provide for blocking the service request caller until a response from the server program in another execution context is received.

According to a still further aspect of the present invention an embodiment of the invention may provide for registering a DXE (Driver Execution Environment) driver port function together with corresponding formal arguments in a first execution context; invoking the DXE (Driver Execution Environment) driver port function in a second execution context; and marshaling the arguments across execution contexts.

Execution contexts may (and for efficiency typically will) be shared by multiple threads in multiple drivers (including DXE drivers). Memory mapped into a particular execution context will not typically be addressable in any other execution context, however UEFI (Unified Extensible Firmware Interface) Foundation program (one embodiment of which is known as Green H in the art) and Kernel will typically be mapped into all execution contexts, either as shared physical memory, copied pure code or by some other similar means.

BRIEF DESCRIPTION OF THE DRAWINGS

The aforementioned and related advantages and features of the present invention will become better understood and appreciated upon review of the following detailed description of the invention, taken in conjunction with the following drawings, which are incorporated in and constitute a part of the specification, illustrate an embodiment of the invention and wherein like numerals represent like elements, and in which:

FIG. 2 shows an event sequence diagram according to an embodiment of the present invention.

DETAILED DESCRIPTION OF THE INVENTION

Figure 1:
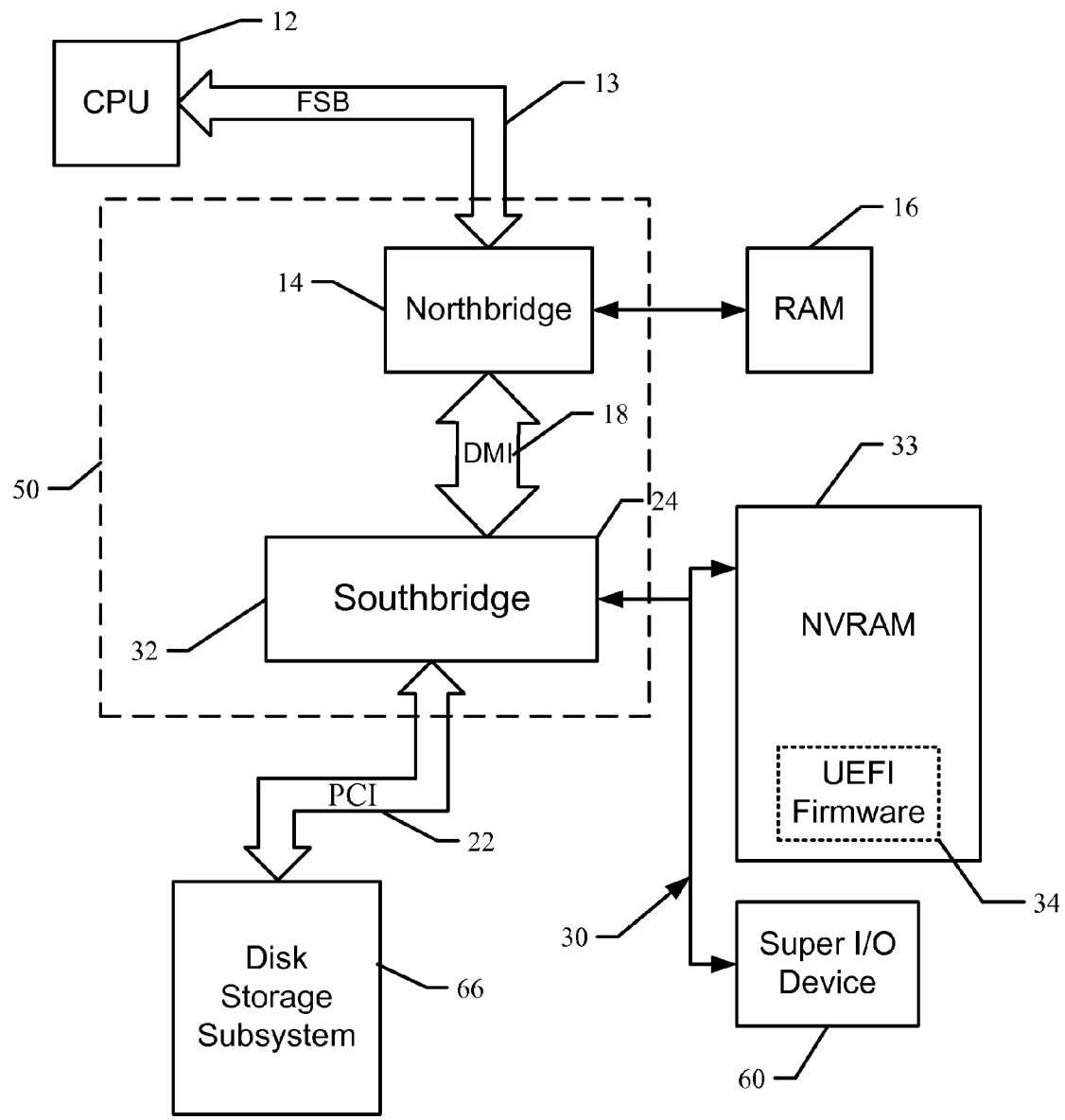
FIG. 1 is a schematic block diagram of an electronic device configured to implement the present invention.

The numerous components shown in the drawings are presented to provide a person of ordinary skill in the art a thorough, enabling disclosure of the present invention. The description of well known components is not included within this description so as not to obscure the disclosure or take away or otherwise reduce the novelty of the present invention and the main benefits provided thereby.

Embodiments of the disclosure presented herein provide methods, systems, apparatus, and computer-readable media for providing and utilizing a means for time saving parallel execution capability in a context of PC startup and initialization. In the following detailed description, references are made to the accompanying drawings that form a part hereof, and in which are shown by way of illustration specific embodiments or examples. Referring now to the drawings, in which like numerals represent like elements throughout the several figures, aspects of an exemplary operating environment and the implementations provided herein will be described.

An exemplary embodiment of the present invention will now be described with reference to the figures. FIG. 1 is a schematic block diagram of an electronic device configured to implement the operational functionality according to the present invention.

FIG. 1 shows a computer 10 that is operative to provide an EFI/UEFI firmware environment to provide a DXE phase and that facilitates timer use and timer based execution parallelism during the DXE phase and even beyond such as into the BDS phase. The computer 10 typically includes a baseboard, or motherboard form of printed circuit board to which a multitude of components or devices are connected by way of a system bus or other electrical communication path. In one illustrative embodiment, a CPU (central processing unit) 12 operates in conjunction with a chipset 50. The CPU 12 is a standard central processor that performs arithmetic and logical operations necessary for the operation of the computer.

Chipset 50 may include a Northbridge 14 and a Southbridge 32. The Northbridge 14 may be attached to CPU 12 by a FSB (Front Side Bus) 13 and typically provides an interface between the CPU 12 and the remainder of the computer 10. The Northbridge 14 may also provide an interface to a RAM (random access memory) 16 the main memory for the computer 10 and, possibly, to other devices such as an on-board graphics adapter (not shown in FIG. 1).

The Northbridge 14 is connected to a Southbridge 32 by a DMI (direct media interface) 18. The Southbridge 32 may be responsible for controlling many of the input/output functions of the computer 10 such as USB (universal serial bus), sound adapters, Ethernet controllers and one or more GPIO (general purpose input/output) port (None shown in FIG. 1). In one embodiment, a bus comprises a PCI (peripheral component interconnect) bus circuit 22 to which a disk storage subsystem 66 (often abbreviated to "disk") or other storage devices for storing an operating system and application programs may be attached.

The Southbridge 32 may also provide SMM (system management mode) circuits and power management circuitry. A peripheral interface 30 may also be provided by the Southbridge 32 for connecting a SuperI/O (Super input-output) device 60. Southbridge 32 may also incorporate a timer circuit for generating timer circuit interrupts typically at periodic intervals.

As known to those skilled in the art, an O/S (operating system) such as may be stored on disk 66 comprises a set of programs that control operations of a computer and allocation of resources. An application program is software that runs on top of the O/S software and uses computer resources made available through the O/S to perform application specific tasks desired by the user.

Disk 66 may also provide non-volatile storage for the computer 10. Although the description of computer-readable media contained herein refers to a mass storage device, such as a hard disk or CD-ROM drive, it should be appreciated by those skilled in the art that computer-readable media can be any available media that can be accessed by the computer 10. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, serial EEPROM, flash memory or other solid state memory technology, CD-ROM, DVD, or other optical storage, magnetic cassettes, magnetic tape, magnetic disk storage or other magnetic storage devices well-known in the art, or any other medium which can be used to store the desired information and which can be accessed by the computer.

The peripheral interface 30 may also connect a computer storage media such as a ROM (Read-only memory, not shown) or, more typically, a flash memory such as a NVRAM (non-volatile random access semiconductor memory) 33 for storing UEFI platform firmware 34 that includes program code containing the basic routines that help to start up the computer 10 and to transfer information between elements within the computer 10. The UEFI firmware 34 is compatible with the UEFI Specification.

It should be appreciated that the computer 10 may comprise other types of computing devices, including hand-held computers, embedded computer systems, personal digital assistants, and other types of computing devices known to those skilled in the art. It is also contemplated that the computer 10 may not include all of the components shown in FIG. 1, may include other components that are not explicitly shown in FIG. 1, or may utilize an architecture different from that shown in FIG. 1.

FIG. 2 shows an event sequence diagram to illustrate an embodiment of operations performed by a computer system initializing in a EFI/UEFI conforming manner, that is following the EFI/UEFI Framework and according to an embodiment of the invention. Details regarding the operation and architecture of EFI/UEFI can be found in the appropriate previously developed and published documentation.

The process is divided into several phases, including a SEC (Security) phase 202, a PEI (Pre-EFI Initialization) phase 204, a DXE (Driver Execution Environment) phase 206, a BDS (Boot Device Selection) phase 208, a TSL (Transient System Load) phase 210, an O/S RT (Run-Time) phase 212, and an AL (After-Life) phase 214. The phases progressively provide a run-time environment for the PC applications.

The SEC phase 202 supports security checks from power-on initiation and authenticates the Foundation as a requirement prior to safely executing it.

The PEI phase 204 provides a standardized method of loading and invoking specific initial configuration routines for the processor, chipset, and motherboard. This phase initializes sufficient system to provide a stable base for continuing. Initialization of core components including CPU, chipset and main motherboard occurs. The PEI phase locates and configures memory and hands it off to the DXE phase immediately following.

The DXE phase 206 is where much of the implementation of embodiments of the invention is to be found. This is the phase during which most of the system initialization is performed. The DXE phase 206 uses a DXE Core, a DXE Dispatcher (also known as the Driver Dispatcher) and a plurality of DXE Driver programs. The DXE Core provides Boot Services, Runtime Services, and DXE Services. The Driver Dispatcher discovers, loads and initiates DXE Drivers according to a pre-defined sequence The DXE drivers initialize components and provide services (including software abstractions of some devices).

The BDS phase 208 further prepares the computer system to load an O/S. This may include such well known programs as GRUB (Grand Unified Bootloader)

The TSL phase 210 facilitates services to be available to an O/S loader. The RT (Run Time) phase 212, is largely software, rather than firmware controlled and includes application programs. EFI Runtime services reemerge in the AL (After Life) phase 214 in connection with winding-up operations.

Figure 3:
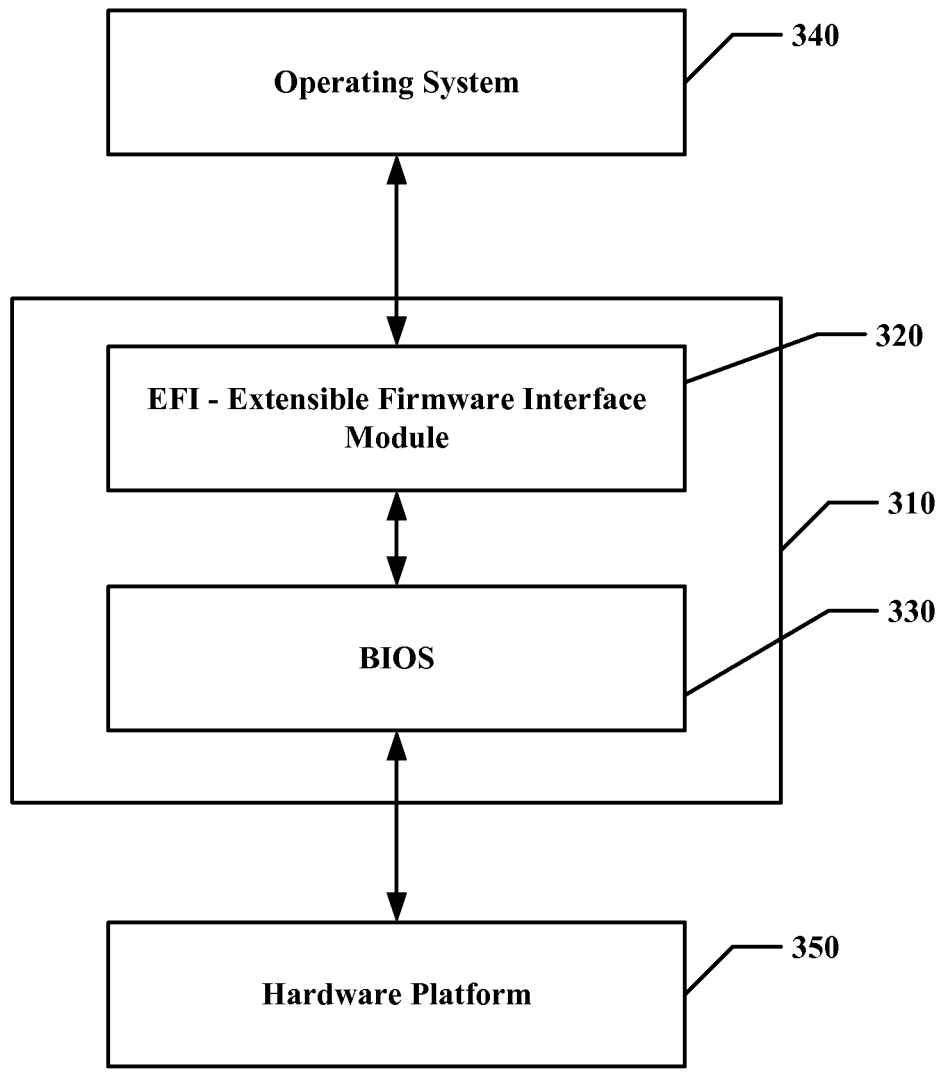
FIG. 3 shows relationships between major hardware, firmware and software components according to an embodiment of the invention.

FIG. 3 shows relationships between major hardware, firmware and software components according to an embodiment of the invention. Referring to FIG. 3, platform firmware 310 comprises one or more modules 320 compliant with the EFI Specification (Extensible Firmware Interface from Intel Corporation) or UEFI (Unified EFI) Specification (from the UEFI Forum—a trade organization). EFI and UEFI specifications describe an interface between O/S (Operating System) 340 and the platform firmware 310. EFI and UEFI specifications also describe the interface platform firmware 310 implements in support of bootloading interface used by O/S 340.

Platform firmwares are implemented in various ways within compliance with EFI and UEFI specifications and also include a BIOS 330 that provides a level of support for access to Hardware Platform 350. Hardware Platform 350 can itself come in multiple guises including hardware per se, as well as supporting microcoded engines and the like.

In previously developed EFI environments, DXE drivers are loaded into Boot Services memory, or Run Time memory, or SMRAM (System management random access memory) and are initialized. However, the isolation associated with driver loads is minimal which has various disadvantages such as the opening of exploits to malware or failure to limit damage due to unintentional malfunction.

In SCT 2.0 (Secure Core Tiano 2.0) products, the Kernel may implement an EC (Execution Context). This may be done for example by use of data and/or function objects such as are well-known in the programming arts. Software or firmware products implemented in DXE driver format may be used as EC provider services. Such EC providers may expose execution contexts for example by invoking a Kernel function to Allocate such an EC. EC providers may receive control from the Kernel whenever a DXE driver running in its context receives control, including during initialization, when its protocols are called, or alternatively whenever any of its dispatchable objects (not limited to, but for example threads, timers, DPCs (deferred procedure calls), interrupts, power fail objects, or power notify objects) are dispatched. Other possibilities are well-known in the art, these may include labels (such as security and reliability labels) that may be applied to VMs (virtual machines) or other subsystems; other examples include TXT (Trusted Execution Technology) measured environments (which are typically enabled or disabled responsive to needs) and various hardware configuration such as persistent states external to major "silicon" (memories chips, CPUs, and "chipset" chips)—this might include for example a flip-flop that control and external latch (for example an optical indicator circuit).

EC providers may perform the special handling that implements a virtual machine context, or the SMM context, or other contexts such as multiple core control, cache memory modes, hardware based memory control schemes and so on, including similar be not yet determined system, memory and processor operational modes and schemes.

EC providers may hook and/or virtualize access to EFI tables and services, may assert orderly control over them, for example so that isolation of the EFI run time environment may be improved.

EC providers, such as a virtualization EC provider, may also create virtual machines such as may be used to isolate groups or even individual DXE drivers or applications, even though those drivers or applications may be unaware of (the existence of) a virtual machine environment in which they operate. A virtual machine environment may establish a firewall (or similar feature) around drivers, inhibiting or reducing damage to a run time environment, or conversely as to incoming damage.

The provision of isolated Execution Contexts in the SCT 2.0 EFI-compatible environment as described above creates a need for provision of a facility for DXE drivers to communicate; even when they are isolated such communication needs to be available in a robust and secure manner. According to an embodiment of the invention, a trusted communication mechanism is provided. It effectively prevents drivers from calling other drivers in non-conforming ways such as a driver being called at locations other than specified entry points, or under adverse or inopportune conditions such as unduly limited stack depth that could eventually cause the called DXE driver program difficulties.

Moreover, in previously developed calling schemes, arguments may be passed on-stack. But in calling across disparate execution contexts the stack of each execution context may not even be mapped within page tables for any other execution context. Hence, such data is not visible across more than one EC (execution context) and therefore cannot be used for argument (or parameter) passing, wherein the passing crosses EC boundaries.

In an exemplary SCT 2.0 EFI-compatible environment that embodies the invention, a mechanism named LPC (Local Procedure Call) is exposed by the Kernel program across all ECs (execution contexts). LPC is exploited by a so-called protocol agent that provide functions to assist Kernel to run interference between DXE drivers (more precisely DXE-compatible driver programs) and driver applications programs that desire to call (or otherwise invoke) one or more functions that may be exposed by other entities, including entities such as DXE drivers that execute while resident in another EC.

In order to maintain certain compatibilities, it is highly desirable that the DXE drivers themselves need not even be tailored to run in (and/or exploit features of) the execution contexts and the EC services provided by Kernel and yet are able to benefit from provision of EC related features. That particular requirement is a significant design constraint that is not addressed by previously developed solutions. Thus, a particular DXE driver may be capable of running in either a classic EFI (or Rio Verde) environment or in a SCT 2.0 environment—but it will typically have better performance and/or robustness in the latter environment. Other DXE drivers may be specifically tailored to run only in a SCT 2.0 environment and may better exploit the features thereof.

The protocol agents may be used to provide the necessary interfacing to and from DXE drivers that may themselves use called features entirely local to the EC to which they belong. At the opposite surface of the protocol agent(s) a corresponding interface provides the necessary interfacing to one or more LPC services provided by Kernel for each transaction.

Thus, a DXE driver may call, in a manner compatible with EFI specifications, an "Allocate-Port" function, passing it a name and receiving in return a handle, typically a GUID (Globally Universal Identifier) or a UUID (Universally Unique Identifier). GUIDs and UUID are well known in the art. The name referred to is the name by which the function is henceforth known. However, in an EFI environment the "Allocate-Port" call is serviced by and enters Foundation (or the so-called "Green H" which is well-known in the art) directly, but in contrast within the SCT 2.0 environment the implementation differs significantly. In SCT 2.0 the protocol agent hooks (in a manner similar to interrupt hooking in legacy software) the Foundation's Allocate-Port service function. It may hook other functions too, especially those pertaining to DXE driver protocol-based communication. Again the EFI protocol service is well-known in the art. Each target (hooked) service in Kernel acts as a surrogate for the corresponding Foundation service.

In order to make the port available from within an EC other than the local EC, the protocol agent may make a corresponding call to a KeAllocatePort function, which invokes that self-same specific service which is provided by Kernel. The KeAllocatePort KPI (Kernel program interface) function is called to allocate an LPC Port object, assigning it a name which may be the same name cited in the call into the corresponding Allocate-Port service function in the protocol agent. A handle GUID (or UUID or substantial equivalent) may be passed back from Kernel to protocol agent which then propagates that same handle (or a substantial equivalent) to the originating DXE driver program.

In contrast with the Allocate-Port function, which is a Foundation function hooked by the protocol agent into a surrogate function in a protocol agent, the KeAllocatePort function is a function in Kernel that provides corresponding capabilities across disparate ECs.

A protocol agent that exposes an LPC port may also be used to define enumerated functions that the port supports by index number. To do this the DXE driver may call a Register_Port_Function service citing the port's handle and providing a structure, or (more typically) actual arguments from which a structure can be built including initialization of at least a part of the structure that comprises means (e.g. pointers) to reach the (DXE driver implemented) function to be registered. Later, the registered function can be referenced or called when another application (which may be in another EC) requests interaction using the port.

In an analogous manner to the KeAllocatePort service described above, the Foundation's own Register_Port_Function may be hooked into the protocol agent which in turn can call down into a corresponding KeRegisterPortFunction Kernel service.

A merely exemplary description of a KeRegisterPortFunction service will now be given. The KeRegisterPortFunction KPI (Kernel Programming Interface) service or function is called to register a local function with a Port object. The server-side caller (typically a DXE driver calling through a protocol agent) assigns an index to be associated with the function, and client-side callers use the same index when requesting a service call through the KeCallPortFunction request. The caller of KeRegisterPortFunction also specifies a pointer to an array of structures that describes the formal parameter list for the function. The structures may describe such things as the size of the parameters, whether they are input, output, or optional, and what kind of parameter they are. Supported parameter data types include, for example, 32-bit, 64-bit, and natural sized values, and perhaps other varieties of pointers. In a circumstance such that a parameter is declared to be a pointer, the storage referenced by the parameter is also described. Pointers can point to device space, ROM (read-only memory), RAM (random access memory), or NULL (i.e. a target void). Non-NULL pointers may point to 8-bit, 16-bit, 32-bit, or 64-bit locations, or buffers. If a parameter points to a buffer, then the buffer's size may be declared by a formal parameter (and the index of the formal parameter is also recorded in the structure.)

The arguments to the KeRegisterPortFunction may include a ParameterList for the service being registered. In an embodiment of the invention this may be a pointer to an array of structures, wherein each structure describes the formal parameters of the respective function. The first element of the array (indexed by 0) represents the first formal argument of the function, unless the first element describes the return value, in which case the second element describes the first argument, and so on for the other elements of the parameter list.

Parameters which are passed in this way to Kernel may include the index by which the corresponding DXE service function will be reached, a local (same EC) function for the Kernel to call when the function is virtually (or otherwise from another EC) invoked, and a pointer to a data structure that describes the formal arguments of the respective function itself Internally, the Kernel may responsively allocate a source of control, such as a thread object, and associate therewith the entire port, or with a group of indexed functions, or with an individual function. The source of control operates to perform a blocking on an event object. Thus Kernel can wake up the protocol agent in the correct EC whenever an incoming LPC call that generates such a need is received.

The server side of cross-EC DXE driver service provision has been described above and we now describe the client side. Clients requesting to call an exposed LPC function (for which the service is typically substantially implemented in a different EC) may call an EFI-compatible Open_Port service that is hooked from Foundation into a protocol agent in the putative client's EC. The client side protocol agent may be considered as being complementary to the corresponding server side protocol agent. The Open_Port service may thus be used to obtain a handle to access service that is provided by a corresponding service provider port allocated at the server side.

In turn the client-side protocol agent may implement the request for a cross-EC Open_Port service by calling down to a KeOpenPort Kernel function, passing that function the name of the port to be opened. The Kernel returns a handle to the open port for subsequent client requests, such as a Call_Port_Function invoked by a DXE driver.

In a like manner to the previously described functions, Kernel hooks the (client side) Call_Port_Function in Foundation and uses EFI-compatible parameters and arguments. Thus, a program may call Call_Port_Function using at least the port's handle and the desired function's index number and in so doing causes an entry into a client-side protocol agent which in turn invokes Kernel's KeCallPortFunction. The client may use this to actually call (invoke) an enumerated function of an opened port, passing it actual parameters or arguments.

An exemplary implementation of a KeCallPortFunction will now be described. The KeCallPortFunction KPI function is called to invoke a function associated with an index assigned to a Port with actual parameters (or arguments). The number of parameters passed on the request is typically not compared with the number of parameters declared by the KeRegisterPortFunction request; this is because the commonly used "C" programming language does not readily provide a means for obtaining the number of actual parameters passed on the stack by a caller. Put simply, the caller is expected to respect the protocol and the EC isolation serves to provide a measure of protection against badly behaved callers.

Parameters to KeCallPortFunction may typically include:
Handle—A handle to the Port object, as returned by KeOpenPort.
Index—A value specifying the index of the function to be called.
ReturnValue—A pointer to a storage location where the return value from the function is stored. If the pointer is NULL, or if the function does not return a value, then the storage will not be used.
Numerous actual parameters that will be passed to the invoked service function. These actual parameters are interpreted as arguments to the service function (which typically resides in another EC) and a needed sequence of actions is set in motion by the call to KeRegisterPortFunction Thus it can be seen that on the server side a DXE driver allocates a port and then registers with the Kernel program at least one (typically more) port function services. Correspondingly, on the client side, a program (typically but not necessarily a DXE driver) opens the port by name and then (assuming the port was successfully opened) calls forth port function services which are assumed to have been registered on the server side. It is the Kernel program's responsibility to run interference between the client side and the server side whenever a function is invoked that requires LPC derived services including spanning two (or more) execution contexts.

The Kernel provides this firewall-like go-between service by using the server side (port owner's) schema to probe and copy the (client side) actual arguments into a secure storage area accessible in both execution contexts. Arguments may be presented on the stack whenever an interaction occurs between protocol agent and Kernel (in either direction). Kernel is present in (substantially) all ECs and the ECs typically have their own stack virtual memories (and/or physical memories). As is well known in the art, various techniques are available for ensuring Kernel presence in multiple VMs (virtual machines) and this can be applied more generally to multiple ECs. For example, Kernel may be present at the same physical and virtual memory addresses pursuant to some identical common page table entries in both ECs. Or alternatively there may be copies of Kernel with Kernel data areas sharing equal physical addresses but having differing virtual addresses in disparate ECs. Kernel may be implemented as pure code, possibly reentrant code, so it is largely moot whether a single or multiple copies of Kernel object code is loaded.

There will now be description of how the Kernel spans multiple ECs in a context of LPC-based services, however as will be apparent to persons of ordinary skill in the art a variety of implementation approaches are feasible and therefore the description following is only a good example. The Kernel's KeCallPortFunction sets the port's event object, causing the port's captive thread to become scheduled (runnable). In this example, the port captive thread is an example of a thread object that was created and blocked on when KeRegisterPortFunction was executed on the server side. The port event object is tied to the port captive thread and used for blocking on. In some embodiments there may be a thread per port function, in other embodiments there may be fewer threads—typically a single thread for the entire port. This depends to an extent on the parallelism capabilities such as those in the DXE driver itself The KeCallPortFunction then blocks on a response event, pausing the calling execution context until the called execution context sets the event, indicating the relevant function in the called execution context has sufficiently completed its processing. Kernel provides for the spanning of events across ECs as part of its ordinary capabilities.

In the target execution context (i.e. the server EC), the registered port's captive thread, having become unblocked, resumes execution and marshals the arguments from the secure storage area to the stack of the target EC. It then calls back the server-side protocol handler which in turn calls the target DXE server port function, all from within the target EC.

After the DXE driver service function completes it returns with results (if any) as arguments and control passes through the protocol agent to the Kernel. The same thread, now executing in Kernel marshals the output arguments to the secure storage area, and sets the particular client-side response event associated with (at least) the port that the caller thread blocked on previously. Kernel then blocks on the incoming request event to await the next call to service.

Then the client caller's thread becomes runnable, by unblocking on a received response event, and obtains output results/arguments from the secure storage area. These may be placed on stack and control returned to the client-side protocol handler which in turn passes back to the original service caller. Results, parameters/arguments may be returned on stack to the client (driver or application program) caller according to the rules set forth in the port's schema.

Thus, as described above, Kernel provides a fast communication method that is safe to use across Execution Contexts, and also for intra-Execution Context communication. This method comprises a Kernel-assisted procedure that provides an substitute for a native procedure call by buffering data within the Kernel.

Procedure calls from one process to another function correctly within a single DXE Execution Context in part because process address space is exposed to other processes within the same EC. However, address space is not shared across Execution Contexts, which is why there is a need for Kernel assistance to direct or indirect calls through published protocols especially across plural ECs as well as within a single EC.

Whenever a driver in the DXE context needs to communicate with a driver in the SMM (System management mode), STM (System Management Interrupt Transfer Monitor), or VT (Virtualization Technology) contexts, special considerations apply. These advanced contexts have different address spaces, and different ways of accessing actual hardware above and beyond mere segmentation and paging. If a pointer is passed from SMM to DXE, the pointer would generally point to the data that is absent except in the caller's own address space in the caller's own EC. This can be for example because a Northbridge intercepts and remaps memory accesses. Therefore, the data located at that address must be copied into a temporary staging buffer available to both contexts and necessarily outside SMRAM (System management memory). Then a pointer to the staging buffer may be passed to the called routine or, for example, arguments may be copied onto the caller's stack. A mostly equivalent inverse process happens for output information.

An additional consideration is that of the execution vehicle used by the calling code; a thread running in a normal DXE Execution Context cannot directly call code in SMRAM even if it could access the code, because the thread of execution must enter SMM through a SMI (System management interrupt). Otherwise the CPU (central processor unit) would be used in an unsupported mode. A similar process happens for VT and STM Execution Contexts.

The isolation provided by SMM and VT may be viewed as improvement on the shared memory DXE Execution Context. However, the special assistance offered by the LPC facility provides the connectivity needed for processes to communicate across the various barriers. In this way, the LPC facility has provided a named Port object that allows a client to register functions for calling through protocol agents and the LPC mechanism. Clients in their own ECs may open the Port by name, and then call its enumerated functions name conflated with ordinal or index. At the time that functions are registered with a Port object, a description of the formal parameters is supplied to the Kernel. This allows the Kernel to understand the actions it must take to later buffer and/or redirect the equivalent arguments passed by callers of the function.

Figure 4:
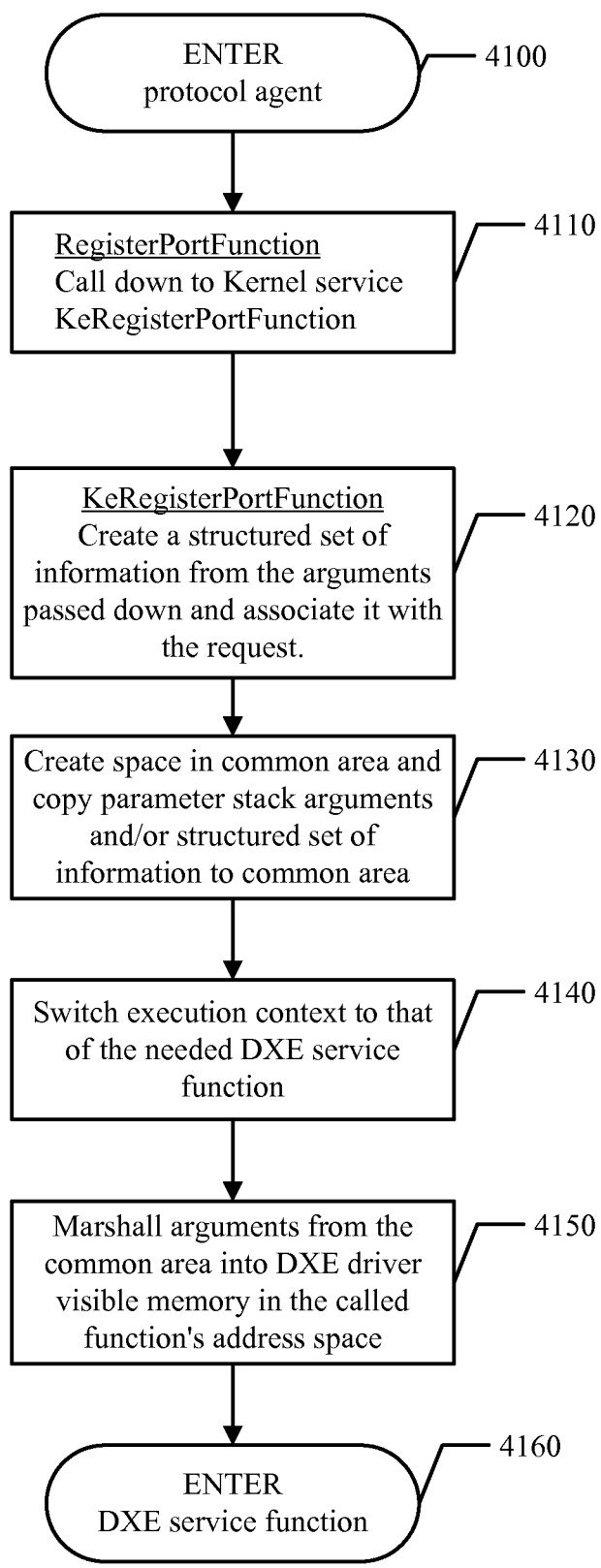
FIG. 4 shows a depiction of a sequence of acts in which part of an exemplary SCT 2.0 system embodiment of the invention is depicted.

Referring to FIG. 4, a sequence of acts is shown in which part of an exemplary SCT 2.0 system embodiment of the invention is depicted.

Enter protocol agent. At Ref. 4100 entry is made to a protocol agent from a DXE driver or an application program that seeks to call a port function that has been previously registered in an execution context other than the present execution context. Typically the DXE driver calls an address in Foundation which has been hooked so as to transfer control to the protocol agent, and that is how the protocol agent captures control.

Perform RegisterPortFunction. At Ref. 4110, the protocol agent's RegisterPortFunction calls down to the Kernel's similar service function of KeRegisterPortFunction.

Perform KeRegisterPortFunction. At Ref. 4120 the KeRegisterPortFunction creates a structured set of information from the arguments passed down and associates it with the request.

At Ref. 4130 and still within Kernel, space in an area common across both calling and called ECs (or all ECs) is located and a copy of parameter stack arguments and/or structured set of information is created in the located space.

At Ref. 4140, The EC is switched from the caller's EC to the EC within which the needed DXE service function is ultimately situated. The implementation of EC switching will be highly implementation dependent At Ref. 4150 execution is now in the target, or server-side EC. The arguments are marshaled from the common area into DXE driver visible memory in the called function's address space. Then the called function is reached through a callback into the called function's protocol handler.

At Ref. 4160, control leaves the protocol handler and the DXE service function is entered.

Figure 5:
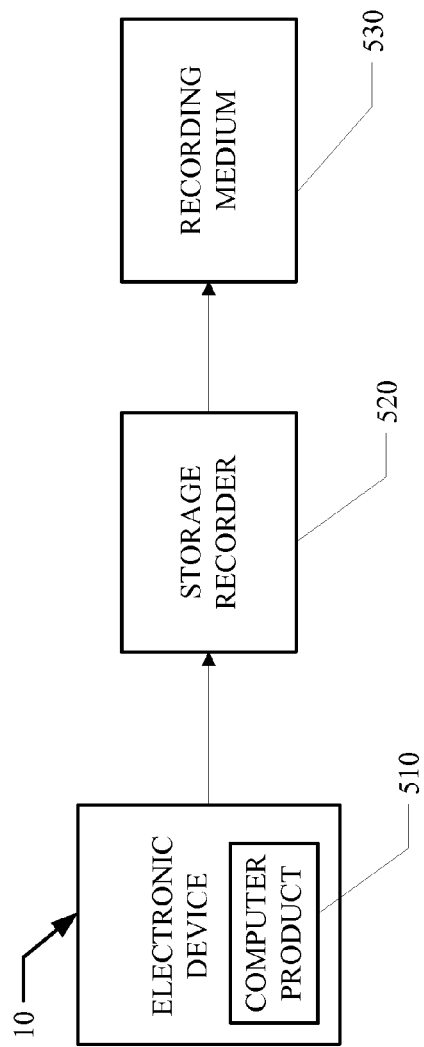
FIG. 5 shows how an exemplary embodiment of the invention may be encoded onto a computer medium or media.

With regards to FIG. 5, computer instructions to be incorporated into an electronic device 10 may be distributed as manufactured firmware and/or software computer products 510 using a variety of possible media 530 having the instructions recorded thereon such as by using a storage recorder 520. Often in products as complex as those that deploy the invention, more than one medium may be used, both in distribution and in manufacturing relevant product. Only one medium is shown in FIG. 5 for clarity but more than one medium may be used and a single computer product may be divided among a plurality of media.

Figure 6:
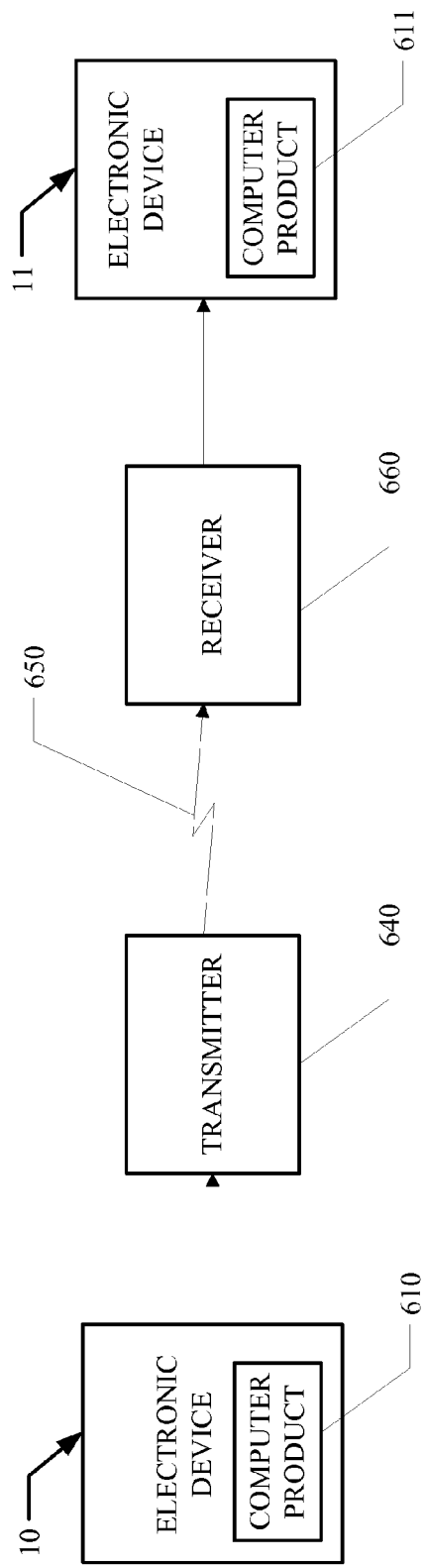
FIG. 6 shows how an exemplary embodiment of the invention may be encoded, transmitted, received and decoded using electro-magnetic waves.

FIG. 6 shows how an exemplary embodiment of the invention may be encoded, transmitted, received and decoded using electro-magnetic waves.

With regard to FIG. 6, additionally, and especially since the rise in Internet usage, computer products 610 may be distributed by encoding them into signals modulated as a wave. The resulting waveforms may then be transmitted by a transmitter 640, propagated as tangible modulated electro-magnetic carrier waves 650 and received by a receiver 660. Upon reception they may be demodulated and the signal decoded into a further version or copy of the computer product 611 in a memory or other storage device that is part of a second electronic device 11 and typically similar in nature to electronic device 10.

Other topologies and/or devices could also be used to construct alternative embodiments of the invention. The embodiments described above are exemplary rather than limiting and the bounds of the invention should be determined from the claims. Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for executing instructions in a device comprising a computer, the method comprising:
   registering a DXE (Driver Execution Environment) driver port function and associating a set of information, including a set of corresponding formal arguments, with a request in a first execution context for a service, the set of information comprising a reference to the service and wherein the service requires honoring at least partially in a second execution context;
   creating a first copy of the set of information in a common area;
   making a first call to a kernel program, responsive to the first call creating a second execution context;
   performing a context switch from the first execution context to the second execution context;
   calling the DXE (Driver Execution Environment) driver port function with the set of information in the second execution context;
   making a LPC (local procedure call) to the kernel program;
   marshaling the first copy of the set of information into an area associated with an execution sequence to honor the service, comprising, copying actual arguments held on stack to an area off stack that is addressable from both first and second execution contexts, wherein the set of actual arguments are non-addressable in the first execution context, and wherein the marshaling is responsive to the LPC.

2. The method of claim 1 wherein:
   performing the context switch comprises an action selected from a list consisting of:
   invoking at least one context dereference routine for the first execution context and invoking at least one context reference routine for the second execution context,
   invoking at least one context dereference facility for the first execution context and invoking at least one context reference facility for the second execution context and
   invoking a combined deference-reference modal facility for dereferencing the first execution context and referencing the second execution context.

3. The method of claim 1 wherein:
   performing the context switch comprises an action selected from a list consisting of:
   switching at least one memory page table that controls a hardware paging unit,
   switching a VM (virtual machine) I-O (input-output) address space,
   switching between a virtualized I-O address space and a non-virtualized I-O address space,
   switching between a SMM (System Management Mode) and a VM (virtual machine) mode,
   switching memory management modes that are controlled by a Northbridge,
   enabling a STM (System Management Interrupt Transfer Monitor),
   disabling the STM (System Management Interrupt Transfer Monitor),
   changing a number of active cores in a CPU (central processing unit) of the computer,
   changing a memory system comprised within the CPU (central processing unit) of the computer from a caching function to a RAM (random access memory) function,
   changing the memory system comprised within the CPU (central processing unit) of the computer to the caching function from the RAM (random access memory) function,
   changing a security label,
   changing a reliability label,
   changing to a TXT (Trusted Execution Technology) measured environment,
   changing from the TXT (Trusted Execution Technology) measured environment, and
   changing a persistent hardware state external to a component of the device, the changing being selected from a list consisting of an external memory and the CPU (central processor unit).

4. The method of claim 1 wherein:
   the performing the context switch action comprises a switching of at least one memory page table that controls a hardware paging unit.

5. The method of claim 1 wherein:
   the performing the context switch action comprises an act selected from a list consisting of a switching of a VM (virtual machine) input-output address space and
   a switching between virtualized a I-O (input-output) address space and a non-virtualized I-O address space.

6. The method of claim 1 wherein:
   the performing the context switch action comprises a switching between a SMM (System Management Mode) and a VM (virtual machine) mode.

7. The method of claim 1 wherein:
   the performing the context switch action comprises a switching of memory management modes that are controlled by a Northbridge.

8. The method of claim 1 wherein:
   the performing the context switch action comprises an enabling of or a disabling of a STM (System Management Interrupt Transfer Monitor).

9. The method of claim 1 wherein:
   the performing the context switch action comprises changing a number of active cores in a CPU (central processing unit) of the computer.

10. The method of claim 1 wherein:
    the performing the context switch action comprises an act selected from a list consisting of
    changing a memory system comprised within a CPU (central processing unit) of the computer from a caching function to a RAM (random access memory) function and
    changing the memory system comprised within the CPU (central processing unit) of the computer to the caching function from the RAM (random access memory) function.

11. The method of claim 1 wherein:
the performing the context switch action comprises changing a label selected from a list consisting of a security label and a reliability label.

12. The method of claim 1 wherein:
the performing the context switch action comprises changing to or from a TXT (Trusted Execution Technology) measured environment.

13. The method of claim 1 wherein:
the performing the context switch action comprises changing a persistent hardware state external to a component of the device selected from a list consisting of an external memory and a CPU (central processor unit).

14. A method for executing instructions in a device comprising a computer, the method comprising:
registering a DXE (Driver Execution Environment) driver port function and a set of corresponding formal arguments in a first execution context;
making a first call to a kernel program, responsive to the first call creating a second execution context;
calling the DXE (Driver Execution Environment) driver port function with a set of actual arguments in the second execution context;
making a LPC (local procedure call) to the kernel program; and
marshaling a copy of the set of actual arguments to the first execution context, comprising, copying actual arguments held on stack to an area off stack that is addressable from both first and second execution contexts, wherein the set of actual arguments are non-addressable in the first execution context, and wherein the marshaling is responsive to the LPC.

15. A computer program product comprising:
at least one non-transitory computer-readable medium having instructions encoded therein, the instructions when executed by a device comprising a computer cause the device to operate to implement the method of:
registering a DXE (Driver Execution Environment) driver port function and associating a set of information, including a set of corresponding formal arguments, with a request in a first execution context for a service, the set of information comprising a reference to the service and wherein the service requires honoring at least partially in a second execution context;
creating a first copy of the set of information in a common area;
making a first call to a kernel program, responsive to the first call creating a second execution context;
performing a context switch from the first execution context to the second execution context;
calling the DXE (Driver Execution Environment) driver port function with the set of information in the second execution context;
making a LPC (local procedure call) to the kernel program;
marshaling the first copy of the set of information into an area associated with an execution sequence to honor the service, comprising, copying actual arguments held on stack to an area off stack that is addressable from both first and second execution contexts, wherein the set of actual arguments are non-addressable in the first execution context, and wherein the marshaling is responsive to the LPC.

16. A computer program product comprising:
at least one non-transitory computer-readable medium having instructions encoded therein, the instructions when executed by a device comprising a computer cause the device to operate to implement the method of:
registering a DXE (Driver Execution Environment) driver port function and a set of corresponding formal arguments in a first execution context;
making a first call to a kernel program, responsive to the first call creating a second execution context;
calling the DXE (Driver Execution Environment) driver port function with a set of actual arguments in the second execution context;
making a LPC (local procedure call) to the kernel program; and
marshaling a copy of the set of actual arguments to the first execution context, comprising, copying actual arguments held on stack to an area off stack that is addressable from both first and second execution contexts, wherein the set of actual arguments are non-addressable in the first execution context, and wherein the marshaling is responsive to the LPC.

17. An electronic device comprising:
a controller; and
a memory having instructions encoded therein, the instructions when executed by the controller cause said electronic device to operate for running an sequence of instructions by steps that implement the method of:
registering a DXE (Driver Execution Environment) driver port function and associating a set of information, including a set of corresponding formal arguments, with a request in a first execution context for a service, the set of information comprising a reference to the service and wherein the service requires honoring at least partially in a second execution context;
creating a first copy of the set of information in a common area;
making a first call to a kernel program, responsive to the first call creating a second execution context;
performing a context switch from the first execution context to the second execution context;
calling the DXE (Driver Execution Environment) driver port function with the set of information in the second execution context;
making a LPC (local procedure call) to the kernel program;
marshaling the first copy of the set of information into an area associated with an execution sequence to honor the service, comprising, copying actual arguments held on stack to an area off stack that is addressable from both first and second execution contexts, wherein the set of actual arguments are non-addressable in the first execution context, and wherein the marshaling is responsive to the LPC.

* * * * *